United States Patent
Sugawara et al.

(10) Patent No.: US 12,491,831 B2
(45) Date of Patent: Dec. 9, 2025

(54) CHARGING BOX

(71) Applicant: ISUZU MOTORS LIMITED, Yokohama (JP)

(72) Inventors: Hiroki Sugawara, Fujisawa (JP); Ken Kijima, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/604,558

(22) Filed: Mar. 14, 2024

(65) Prior Publication Data

US 2024/0317162 A1    Sep. 26, 2024

(30) Foreign Application Priority Data

Mar. 23, 2023 (JP) .................. 2023-046909

(51) Int. Cl.
*B60R 16/03* (2006.01)
*E05D 3/02* (2006.01)
*H01R 13/447* (2006.01)
*E05B 65/52* (2006.01)

(52) U.S. Cl.
CPC ............. *B60R 16/03* (2013.01); *E05D 3/02* (2013.01); *H01R 13/447* (2013.01); *E05B 65/52* (2013.01); *H01R 2201/26* (2013.01)

(58) Field of Classification Search
CPC ......... B60R 16/03; E05D 3/02; H01R 13/447; H01R 2201/26; E05B 65/52
USPC ................ 220/315, 3.3, 4.02, 845, 848, 849
See application file for complete search history.

(56) References Cited

U.S. PATENT DOCUMENTS

| | | | | |
|---|---|---|---|---|
| 5,437,491 A | * | 8/1995 | Nedbal | B60K 15/05 296/97.22 |
| 5,836,638 A | * | 11/1998 | Slocum | B60K 15/05 292/341.15 |
| 6,105,403 A | * | 8/2000 | Carow, Jr. | D06F 37/28 220/849 |
| 6,182,848 B1 | * | 2/2001 | Wang | E05D 1/06 16/266 |
| 8,261,581 B2 | * | 9/2012 | Cerruti | A47L 15/4418 68/17 R |

FOREIGN PATENT DOCUMENTS

| | | | | |
|---|---|---|---|---|
| CN | 104709364 A | * | 6/2015 | ......... B60L 11/1818 |
| JP | 54145943 A | * | 11/1979 | |
| JP | S62-236981 A | | 10/1987 | |
| JP | H1018349 A | | 1/1998 | |

(Continued)

*Primary Examiner* — Orlando E Aviles
*Assistant Examiner* — Niki M Eloshway
(74) *Attorney, Agent, or Firm* — Shih IP Law Group, PLLC

(57) ABSTRACT

The charging box includes: a box-shaped housing; a power receiver that is provided to an opening of the housing and can be connected to an external connector of an external power supply device; a door that pivots between a closed position where the opening is sealed and an open position where the opening is unsealed; a hinge that is provided with a rotation shaft at a position facing an inner wall surface of the housing and pivotally supports the door relative to the housing; and a sealing member that is sandwiched between the opening and the door when the door is at the closed position. An edge of the opening on the hinge side is positioned closer to the center of the opening than the rotation shaft.

8 Claims, 5 Drawing Sheets

(56) References Cited

FOREIGN PATENT DOCUMENTS

| | | | |
|---|---|---|---|
| JP | 3050233 U | | 4/1998 |
| JP | H10168941 A | | 6/1998 |
| JP | 2012-066696 A | | 4/2012 |
| JP | 2012165531 A | * | 8/2012 |
| JP | 2012236457 A | | 12/2012 |
| JP | 2017103837 A | | 6/2017 |

* cited by examiner

CHARGING BOX

CROSS-REFERENCE TO RELATED APPLICATIONS

The present application claims priority to Japanese Patent Application number 2023-046909, filed on Mar. 23, 2023 contents of which are incorporated herein by reference in their entirety.

BACKGROUND OF THE INVENTION

The present disclosure relates to a vehicle charging box capable of supplying power from an external power supply device.

A charging box, capable of supplying power from an external power supply device, is attached to the body frame of vehicles such as trucks. The charging box is provided with a power receiver at an opening of its housing, and this receiver can be connected to an external connector on a power supply device. An openable and closable door, connected to the housing via a hinge, serves to seal the opening (see Japanese Unexamined Patent Application Publication No. 2012-66696).

However, the above-described charging box is exposed to the outside. Incidents such as splashing water or snowfall can lead to the freezing of the hinge, making the door immovable and preventing vehicle charging.

Additionally, although a sealing member is provided to the opening, force may act on the sealing member in accordance with the opening and closing of the door, causing damage to the sealing member.

BRIEF SUMMARY OF THE INVENTION

The present disclosure has been made in view of these points, and its object is to achieve a configuration capable of facilitating the smooth opening and closing of the charging box door while preventing damage to a sealing member.

An aspect of the present disclosure provides a charging box attached to a body frame and capable of supplying power from an external power supply device, the charging box including: a box-shaped housing; power receivers that are provided in an opening of the housing and can be connected to an external connector of the external power supply device; a door that pivots between a closed position, where the opening of the housing is sealed, and an open position, where the opening is unsealed; a hinge that is provided with a rotation shaft at a position facing an inner wall surface of the housing and pivotally supports the door relative to the housing; and a sealing member that is sandwiched between the opening and the door when the door is positioned at the closed position, wherein an edge of the opening on a hinge side is positioned closer to the center of the opening than the rotation shaft.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of the Charging Box>

A configuration of a charging box will be described with reference to FIGS. 1 to 4.

Figure 1:
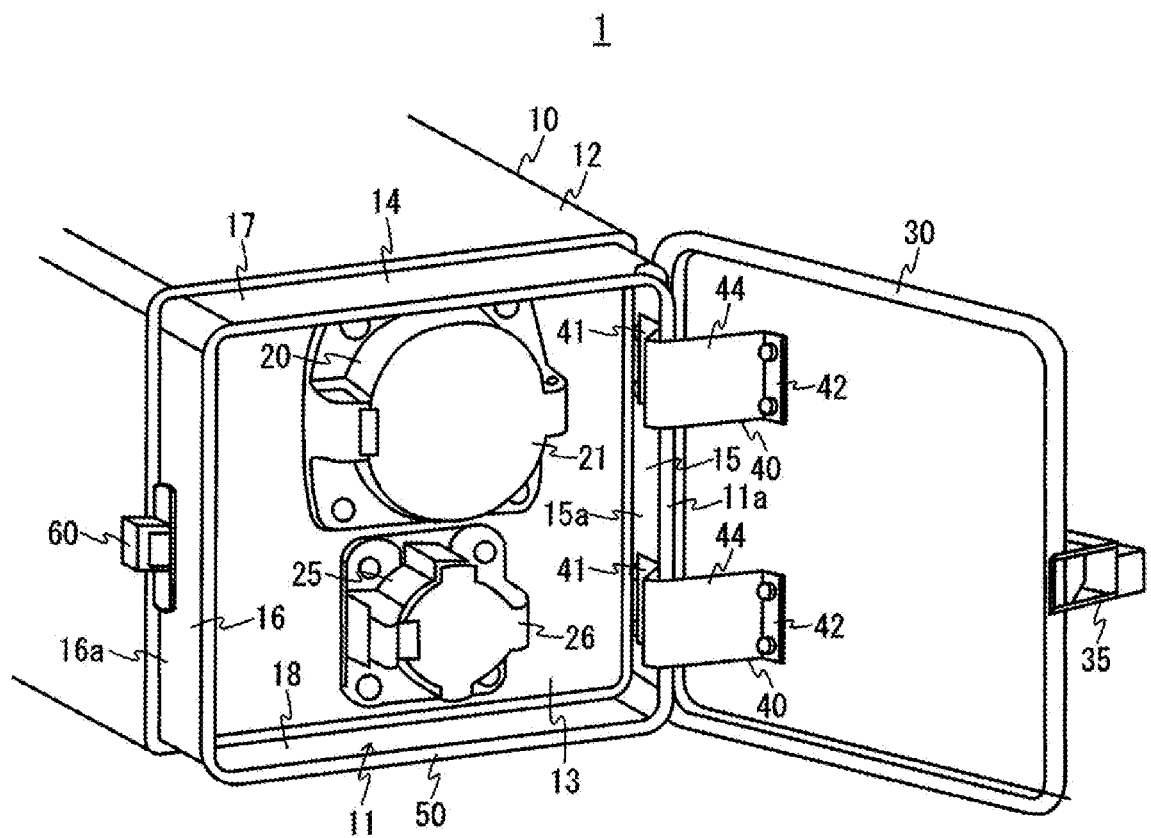
FIG. 1 is a schematic diagram showing a configuration of a charging box 1.
Figure 1:
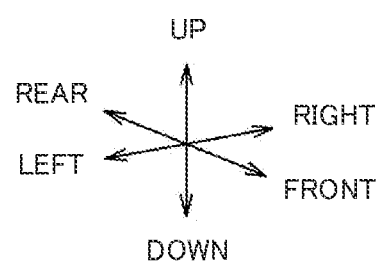
Figure 2:
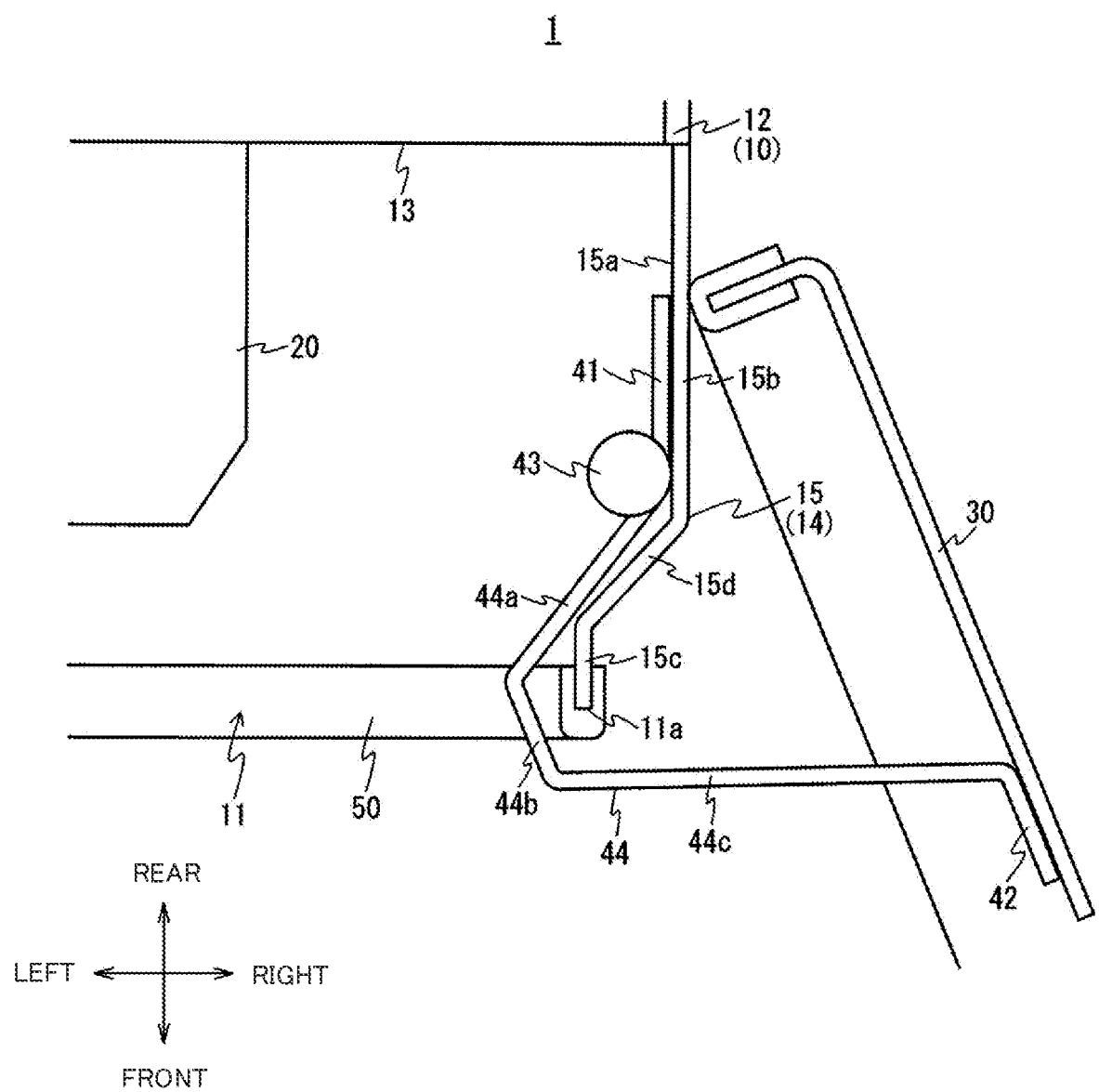
FIG. 2 is a schematic diagram of the charging box 1 in which a door 30 is positioned at an open position, when viewed from above.
Figure 3:
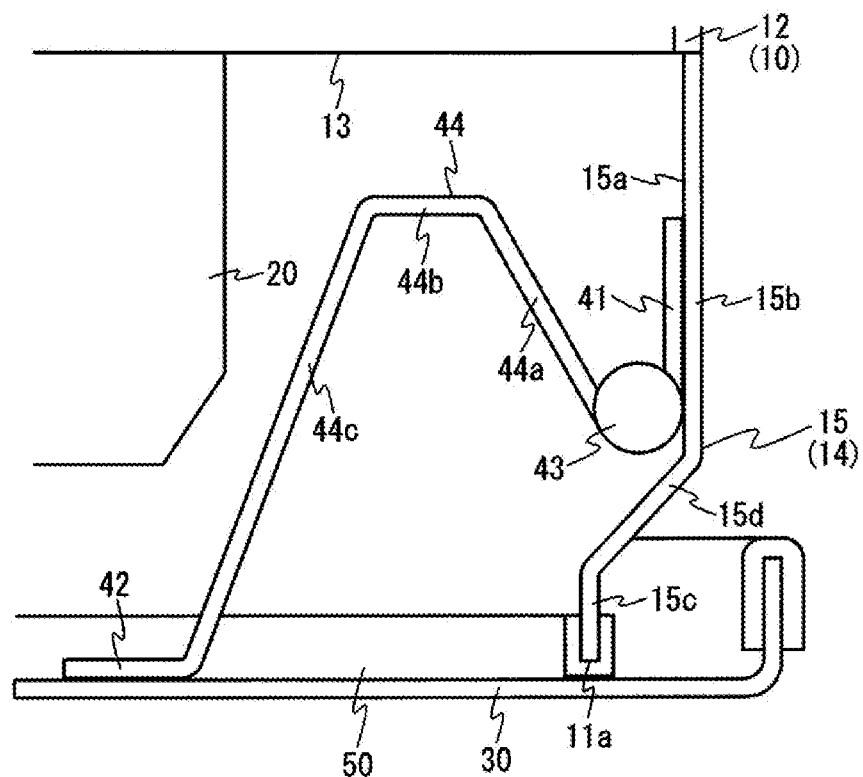
FIG. 3 is a schematic diagram of the charging box 1 in which the door 30 is positioned at a closed position, when viewed from above.
Figure 4:
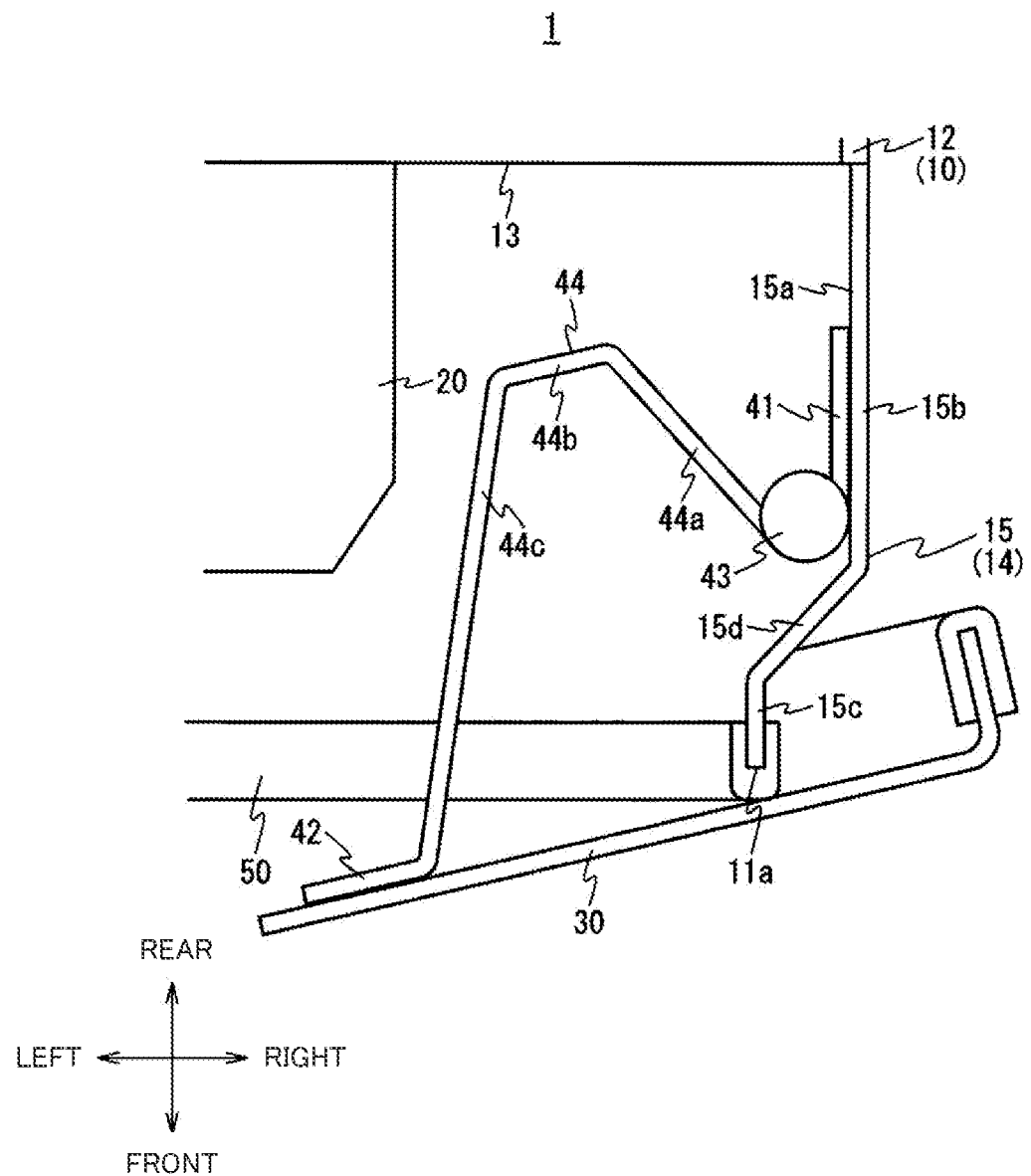
FIG. 4 is a schematic diagram showing a state where the door 30 that is pivoting to the closed position comes into contact with the sealing member 50.

FIG. 1 is a schematic diagram showing a configuration of a charging box 1. FIG. 2 is a schematic diagram of the charging box 1 in which a door 30 is positioned at an open position, when viewed from above. FIG. 3 is a schematic diagram of the charging box 1 in which the door 30 is positioned at a closed position, when viewed from above. FIG. 4 is a schematic diagram showing a state where the door 30 that is pivoting to the closed position comes into contact with a sealing member 50.

The charging box 1 is a device for charging a battery mounted in a vehicle with electricity supplied from an external power supply device. The charging box 1 is connected to the battery via a cable. The charging box 1 is attached to a body frame of a vehicle having a truck-like frame structure. For this reason, the charging box 1 is exposed to the outside, and thus the charging box 1 may be exposed to splashing water or snowfall during traveling of the vehicle.

As shown in FIG. 1, the charging box 1 includes a housing 10, power receivers 20 and 25, a door 30, a hinge 40, a sealing member 50, and a locking portion 60.

The housing 10 is formed in a box shape. The housing 10 is fixed to the body frame via a bracket. The front side of the housing 10 is an opening 11. As shown in FIG. 1, the housing 10 includes a main body 12 and a cylinder 14.

Here, the main body 12 has a rectangular parallelepiped shape. A cable or the like is disposed inside the main body 12. The power receivers 20 and 25 are provided on a front surface 13, which is a peripheral surface of the main body 12, in a manner to protrude from the front surface 13.

The cylinder 14 is formed in a cylindrical shape in a manner to surround the power receivers 20 and 25. One end of the cylinder 14 in the axial direction is connected to the front surface 13 of the main body 12. The other end of the cylinder 14 in an axial direction (a front end in the front-rear direction shown in FIG. 1) is an opening 11. The cylinder 14 is a rectangular cylinder and includes a right wall 15, a left wall 16, an upper wall 17, and a lower wall 18.

The right wall 15 and the left wall 16 are walls that are parallel to the up-down direction shown in FIG. 1, and the upper wall 17 and the lower wall 18 are walls that are parallel to the left-right direction. One end fixing portion 41 of the hinge 40 is fixed to the right wall 15. Specifically, the one end fixing portion 41 of the hinge 40 is fixed to an inner wall surface 15a of the right wall 15. The locking portion 60 is provided on the left wall 16 that opposes the right wall 15. Specifically, the locking portion 60 is provided on an outer peripheral surface 16a of the left wall 16.

In the present embodiment, the left wall 16, the upper wall 17, and the lower wall 18 are flat walls, but the right wall 15 is a wall having steps as shown in FIG. 2. As shown in FIG. 2, the right wall 15 has one end 15b, the other end 15c, and an inclined portion 15d.

The one end 15b is a portion on the one end side of the cylinder 14 in the axial direction, and is connected to the front surface 13 of the main body 12. The one end fixing portion 41 of the hinge 40 is fixed to the one end 15b via a fastening member. Further, a rotation shaft 43 of the hinge 40 faces the one end 15b.

The other end 15c is a portion on the other end side of the cylinder 14 in the axial direction, and forms the opening 11. As shown in FIG. 2, the other end 15c is positioned closer to the left (closer to the center of the opening 11) than the one end 15b. Therefore, the opening area of the other end 15c of the cylinder 14 is narrower than the opening area of the one end 15b of the cylinder 14. The sealing member 50 is attached to a distal end of the other end 15c.

The inclined portion 15d connects the one end 15b and the other end 15c, and is inclined such that the other end 15c becomes narrower than the one end 15b. The inclined portion 15d is positioned closer to the other end than the one end in the axial direction of the cylinder 14. The inclination angle of the inclined portion 15d is set so that the inclined portion 15d does not contact a connecting portion 44 of the hinge 40 when the door 30 is positioned at the open position as shown in FIG. 2.

The power receivers 20 and 25 are portions that receive power from the external power supply device. The power receivers 20 and 25 are provided in a manner to face the opening 11 of the housing 10. The power receivers 20 and 25 have a power receiving port that can be connected to an external connector (specifically, a charging gun) of the external power supply device. The power receivers 20 and 25 receive power from the external power supply device, in a state where the power receiving ports are connected to the charging gun. The power receiver 20 is a power receiver for fast charging, and the power receiver 25 is a power receiver for regular charging. As an example, the power receiver 20 receives power using an outlet of single-phase 100 V in the regular charging, and in the fast charging, the power receiver 25 receives power using a power supply of three-phase 200 V in a short time.

The power receivers 20 and 25 have openable and closable lids 21 and 26. In FIG. 1, the lids 21 and 26 cover the power receiving ports of the power receivers 20 and 25, but opening the lids 21 and 26 exposes the power receiving ports. Charging is performed by the driver or the like inserting the charging gun into the power receiving port with the lids 21 and 26 opened.

The door 30 seals the opening 11 of the housing 10 or unseals the opening 11. The door 30 unseals the opening 11 when the vehicle is charged, and seals the opening 11 when the vehicle is not charged. The door 30 pivots between the closed position (FIG. 3), where the opening 11 of the housing 10 is sealed, and the open position (FIG. 2), where the opening 11 is unsealed. The door 30 pivots from the closed position to the front in the front-rear direction of the vehicle, reaching the open position.

The hinge 40 pivotally supports the door 30 relative to the housing 10. In the present embodiment, two hinges 40 are provided in the up-down direction, but they have similar configurations. Here, the hinge 40 positioned above will be described as an example.

As shown in FIG. 2, the hinge 40 includes the one end fixing portion 41, the other end fixing portion 42, the rotation shaft 43, and the connecting portion 44. The one end fixing portion 41 is fixed to the housing 10, and the other end fixing portion 42 is fixed to the door 30.

The rotation shaft 43 is connected to the one end fixing portion 41. As shown in FIGS. 2 and 3, the rotation shaft 43 serves as a rotation center when the door 30 opens and closes. The rotation shaft 43 is provided at a position facing an inner wall surface of the housing 10. Specifically, the rotation shaft 43 faces the inner wall surface 15a of the one end 15b on the right wall 15 of the cylinder 14.

The connecting portion 44 connects the rotation shaft 43 and the other end fixing portion 42. When the door 30 opens and closes, the connecting portion 44 pivots about the rotation shaft 43 together with the door 30. The connecting portion 44 is shaped as a flat plate that has been bent. As shown in FIG. 2, the connecting portion 44 includes a first flat plate 44a, a second flat plate 44b, and a third flat plate 44c.

The first flat plate 44a is connected to the rotation shaft 43. The second flat plate 44b is connected to the first flat plate 44a in a manner to form an obtuse angle. The third flat plate 44c is connected to the second flat plate 44b and the other end fixing portion 42. Specifically, one end of the third flat plate 44c is connected to the second flat plate 44b in a manner to form an obtuse angle, and the other end of the third flat plate 44c is connected to the other end fixing portion 42. As described above, forming the connecting portion 44 by connecting the first flat plate 44a, the second flat plate 44b, and the third flat plate 44c to each other makes it possible to ensure a large rotation angle (here, approximately 120 degrees) at the time when the door 30 opens, even though the hinge 40 is provided on the inner wall surface of the housing 10.

When the door 30 is positioned at the closed position as shown in FIG. 3, the hinge 40 is positioned in the housing 10 and is not exposed to the outside. Therefore, when the door 30 is positioned at the closed position, there is no worry that the hinge 40 would be exposed to splashing water or snowfall. In contrast, when the door 30 is positioned at the open position, the connecting portion 44 pivots outwards beyond the right wall 15, so that the rotation angle of the door 30 increases. When the door 30 is positioned at the open position, as shown in FIG. 2, the first flat plate 44a is positioned adjacent to an inner wall surface of the cylinder 14, the second flat plate 44b is positioned across the opening 11, and the third flat plate 44c is positioned outward from the opening 11.

The sealing member 50 is a member for sealing the space between the housing 10 and the door 30. The sealing member 50 is disposed in an annular shape along a distal end of the opening 11. That is, the sealing member 50 is provided in an annular shape along the distal end (edge 11a) of the other end 15c of the cylinder 14. As shown in FIG. 4, the sealing member 50 contacts the door 30 that is pivoting to the closed position. The sealing member 50 is sandwiched between the opening 11 of the housing 10 and the door 30 when the door 30 is positioned at the closed position. That is, the sealing member 50 realizes sealing performance by being compressed between the opening 11 and the door 30.

In the present embodiment, as shown in FIG. 2, the edge 11a of the opening 11 on the hinge 40 side is positioned closer to the center of the opening than the rotation shaft 43 of the hinge 40. Such a positional relationship makes it possible to prevent damage to the sealing member 50 when the door 30 opens and closes, as described below.

Figure 5A:
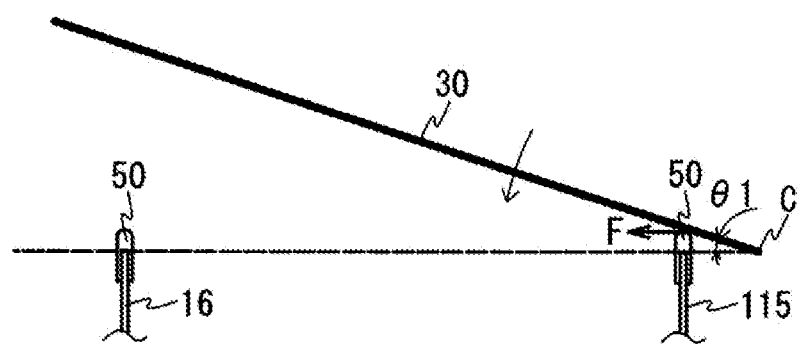
FIGS. 5A and 5B are each a schematic diagram for explaining force acting on the sealing member 50 when the door 30 closes.
Figure 5B:
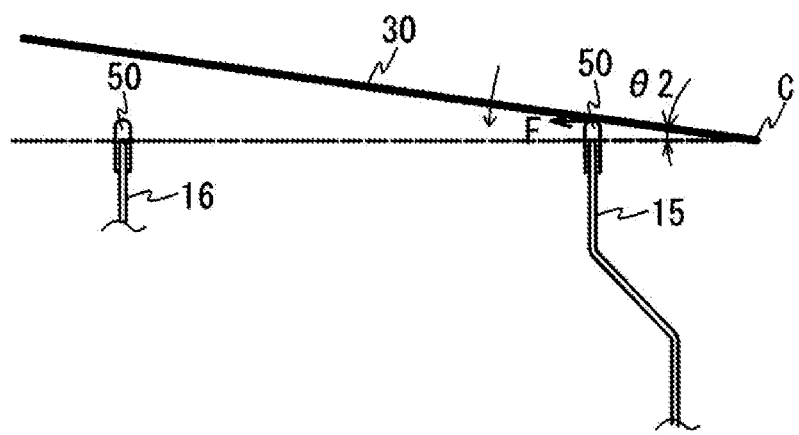

FIGS. 5A and 5B are each a schematic view for explaining force acting on the sealing member 50 when the door 30 closes. FIG. 5A shows a comparative example, and FIG. 5B shows the present embodiment. It should be noted that a horizontal line indicated by a broken line indicates the closed position of the door 30. In FIGS. 5A and 5B, for convenience of explanation, only the door 30 is shown by simplifying the door 30 and the hinge 40 shown in FIG. 4. For this reason, FIG. 5B is a diagram in which the state of FIG. 4 has been simplified.

In the comparative example, unlike in the present embodiment, a right wall 115 of the cylinder 14 does not have steps. Therefore, the right wall 115 is positioned closer to a rotation center C of the door 30 (the rotation center C corresponds to the rotation shaft 43 of the hinge 40 in FIGS. 5A and 5B, which have been simplified). In this case, when the door 30 closes, the door 30 comes into contact with the sealing member 50, causing a force F to act on the sealing member 50. The force F is a lateral force acting on the sealing member 50 in a lateral direction. The force F continues to act on the sealing member 50 until the door 30 moves from the position shown in FIG. 5A to the closed position. Since the sealing member 50 is designed to be compressed in the thickness direction, the sealing member 50 may be damaged when the force F acts on the sealing member 50 in the lateral direction.

In the present embodiment, in contrast, the right wall 15 serving as steps of the cylinder 14 is separated from the rotation center C of the door 30, as shown in FIG. 5B. Accordingly, an angle θ2 between the closed position and the door 30 at the time of coming into contact with the sealing member 50 is smaller than an angle θ1 therebetween in the comparative example. Therefore, the amount by which the sealing member 50 is displaced in the lateral direction by the door 30 until the door 30 moves to the closed position is reduced, making it possible to reduce the force F acting on the sealing member 50. As a result, in the present embodiment, it is possible to prevent damage to the sealing member 50 caused by the lateral force F acting on the sealing member 50 when the door 30 closes.

The locking portion 60 has a function of locking the door 30 positioned at the closed position to the housing 10. The locking portion 60 is provided on an outer peripheral surface 16a of the left wall 16 of the cylinder 14. The locking portion 60 locks the door 30 positioned at the closed position, in a state of being engaged with a hook 35 provided on the door 30.

The locking portion 60 is positioned rearward from the hinge 40 in the front-rear direction of the vehicle (the left-right direction in FIG. 1). Due to this, since the locking portion 60 is disposed in a manner to face the rear of the vehicle, it is possible to prevent splashing of water on the road onto the locking portion 60 during traveling of the vehicle. As a result, it is possible to prevent the locking portion 60 from freezing due to water splashed on the locking portion 60.

In the above description, the sealing member 50 is provided to the cylinder 14, but the embodiment is not limited to this. For example, the sealing member 50 may be provided on the door 30, and the sealing member 50 may be sandwiched between the cylinder 14 and the door 30 when the door 30 is positioned at the closed position.

Further, in the above description, a plurality of power receivers (power receivers 20 and 25) are provided in the charging box 1, but the embodiment is not limited to this. For example, only one power receiver (e.g., the power receiver 20) need be provided in the charging box 1.

Effects of the Present Embodiment

The charging box 1 of the above-described embodiment includes: the door 30 that opens and closes the opening 11 of the housing 10; the hinge 40 that is provided with the rotation shaft 43 on the inner wall surface of the housing 10 and pivotally supports the door 30; and the sealing member 50 that is sandwiched between the opening 11 and the door 30 positioned at the closed position. Further, the edge 11a of the opening 11 on the hinge 40 side is positioned closer to the center of the opening than the rotation shaft 43 of the hinge 40.

In the case of the above configuration, the hinge 40 is positioned in the housing 10 when the door 30 is closed, preventing the hinge 40 from being exposed to splashing water or snowfall. Therefore, it is possible to prevent the door 30 from becoming unable to open due to the hinge 40 (especially, the rotation shaft 43) being frozen.

Further, since the edge 11a of the opening 11 on the hinge 40 side is positioned closer to the center of the opening than the rotation shaft 43 of the hinge 40, it is possible to delay the timing at which the door 30 comes into contact with the sealing member 50, when the door 30 closes. This makes it possible to reduce the lateral force acting on the sealing member 50 when the door 30 closes, preventing damage to the sealing member 50.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A charging box attached to a body frame and capable of supplying power from an external power supply device, the charging box comprising:
    a box-shaped housing;
    power receivers that are provided in an opening of the housing and can be connected to an external connector of the external power supply device;
    a door that pivots between a closed position, where the opening of the housing is sealed, and an open position, where the opening is unsealed;
    a hinge that is provided with a rotation shaft at a position facing an inner wall surface of the housing and pivotally supports the door relative to the housing; and
    a sealing member that is sandwiched between the opening and the door when the door is positioned at the closed position, wherein
    an edge of the opening on a hinge side is positioned closer to the center of the opening than the rotation shaft;
    the housing includes:
        a main body provided with the power receivers on a peripheral surface; and
        a cylinder, in which one end in an axial direction is connected to the peripheral surface and an other end in the axial direction forms the opening, that surrounds the power receivers,
    the cylinder includes an inclined portion connecting the one end and the other end, and inclined such that the other end closer to the center of the opening becomes narrower than the one end, wherein
    the rotation shaft of the hinge is provided at a position facing an inner wall surface of the one end of the cylinder.

2. The charging box according to claim 1, wherein the sealing member is provided in an annular shape along a distal end of the other end of the cylinder.

3. The charging box according to claim 1, wherein
the inclined portion is positioned closer to the other end than the one end in an axial direction of the cylinder.

4. The charging box according to claim 1, wherein
the hinge includes a connecting portion that connects the rotation shaft and the door, and pivots about the rotation shaft in conjunction with opening and closing of the door.

5. The charging box according to claim 4, wherein
the connecting portion includes: a first flat plate connected to the rotation shaft; a second flat plate connected to the first flat plate in a manner to form an obtuse angle; and a third flat plate having one end connected to the second flat plate in a manner to form an obtuse angle and the other end connected to a fixing portion of the door.

6. The charging box according to claim 5, wherein
when the door is positioned at the open position, the first flat plate is positioned adjacent to the inclined portion of the cylinder, the second flat plate is positioned across the opening, and the third flat plate is positioned outward from the opening.

7. The charging box according to claim 1, wherein
the door pivots from the closed position to the front in a front-rear direction of a vehicle to reach the open position.

8. The charging box according to claim 7, further comprising:
a locking portion for locking the door positioned at the closed position to the housing, wherein
the locking portion is positioned rearward from the hinge in the front-rear direction.

* * * * *